UNITED STATES PATENT OFFICE.

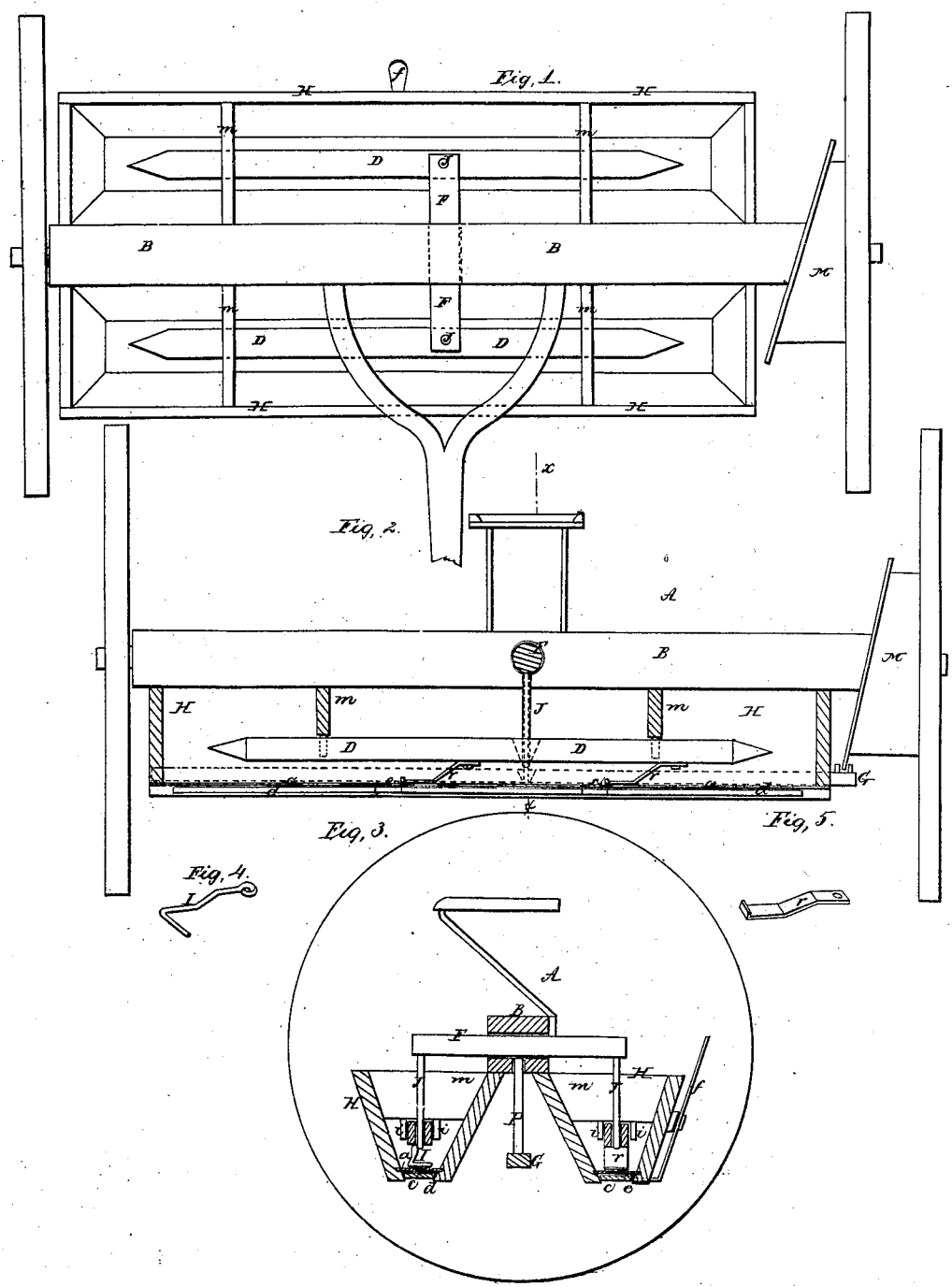

J. C. GASTON, OF READING, OHIO.

IMPROVEMENT IN MACHINES FOR SOWING GRAIN AND FERTILIZERS.

Specification forming part of Letters Patent No. 16,539, dated February 3, 1857.

*To all whom it may concern:*

Be it known that I, J. C. GASTON, of Reading, in the county of Hamilton and State of Ohio, have invented certain new and useful Improvements in Machines for Sowing Grain and Fertilizing Materials, of which the following is a full, clear, and exact description, reference being had to the annexed drawings, making part of this specification.

Figure 1 represents a plan of my improved machine complete. Fig. 2 is a vertical longitudinal section through the center of one of the hoppers. Fig. 3 is a vertical cross-section through the line $xx$ of Fig. 2; Fig. 5, a view of one of the cut-offs, $r$, detached from the machine.

The nature of my invention consists in the arrangement, in machines for sowing grain and fertilizing materials, of a reciprocating feed-bar for the purpose of regulating the quantity of grain or compost supplied to the escape-valves, so that it may always be the same, and in arranging to the lower side of this feed-bar cut-offs or agitators to regulate the discharge of grain or fertilizer being sown or permit a continuous supply to pass through the valves, if desired.

To enable others skilled to make and use my improved machine for sowing grain and fertilizing materials, I will proceed to describe the same in detail.

Like letters indicate similar parts in all the figures.

A in the annexed drawings represents a two-wheel carriage. To the lower side of the axle B of this carriage are secured two hoppers, H, which contain the grain and compost to be sown. The bottoms $a$ of these hoppers are perforated with suitable openings, $c$, through which the grain and compost are discharged. Beneath these bottoms $a$ are placed slides $d$, with openings corresponding with those in the bottoms $a$, for the purpose of gaging the discharge of grain or compost and to close entirely the openings $c$, if desired. The slides $d$ are operated by means of a hand-lever, $f$, secured to the hoppers in any convenient manner, its lower end, $e$, entering a slot formed in the side of the slide $d$, or may be pivoted thereto by a bolt and nut. When small seed, like clover, is to be sown, the openings $c$ will require to be considerably diminished by moving the slides $d$ partially over the openings $c$, and when larger grain is to be sown the openings $c$ may be enlarged by the slides $d$ to their full size if necessary. To equalize the amount of grain or compost being sown and to always present the same quantity to the openings $c$, I have arranged a reciprocating bar, D, at the required distance above the bottom of the hopper H and directly over the opening $c$.

To the lower side of the bar D, I have secured plates of sufficient size to cover the openings $c$, so that when the bar D reciprocates the openings $c$ will alternately be closed and unclosed by these plates $r$. The front end of these plates $r$ are curved upward, as seen in Figs. 2 and 5, so as to agitate or loosen the grain or compost in their forward and backward motions.

When a continuous supply of grain or compost is desired I have secured to the lower side of the bar D, instead of the plates $r$, simple hooks I, as seen in Figs. 3 and 4, which, as they pass back and forth over the openings $c$, agitate and loosen the grain or compost, thereby keeping a continued and equal discharge through the openings. These reciprocating bars D rest upon the slides $r$ or hooks I, and are retained in position by guide-pins $i$, secured to the lower sides of the partitions $m$ of the hoppers H.

Through the axle B, or secured thereto in any convenient manner, is placed a rock-shaft, F, which receives its motion through an arm, P, from the sliding bar G, driven by the cam M, secured to the inner side of one of the carriage-wheels, as shown in Figs. 2 and 3. To the ends of this rock-shaft are secured arms J, extending downward and entering mortises formed in the bars D, as seen in dotted lines, Fig. 2, also shown in Fig. 3, by which arms, as the rock-shaft is operated by the sliding bar G, driven by the cam M, the bars D are moved back and forth, by which means the grain or compost passing under or around the sides of said bars is supplied in unvarying quantities to the valves $c$.

Having thus fully described my improved machine for sowing grain or fertilizing materials, what I claim therein as new, and desire to secure by Letters Patent, is—

The arrangement, in machines for sowing grain and fertilizing materials of a reciprocating feed-bar, D, at the required distance from the bottom of the hopper for equalizing the supply of grain or fertilizing substance to the escape valves c, and securing to said bar hooks or slides by which the grain or compost is agitated and caused to escape either in a continuous supply or at intervals, substantially as described.

JER. C. GASTON.

Witnesses:
 ANDREW W. HARRIS,
 D. S. ACKERMAN.